April 22, 1941.  E. R. BARRETT  2,239,029
DUMP BODY
Filed May 20, 1940  2 Sheets-Sheet 1
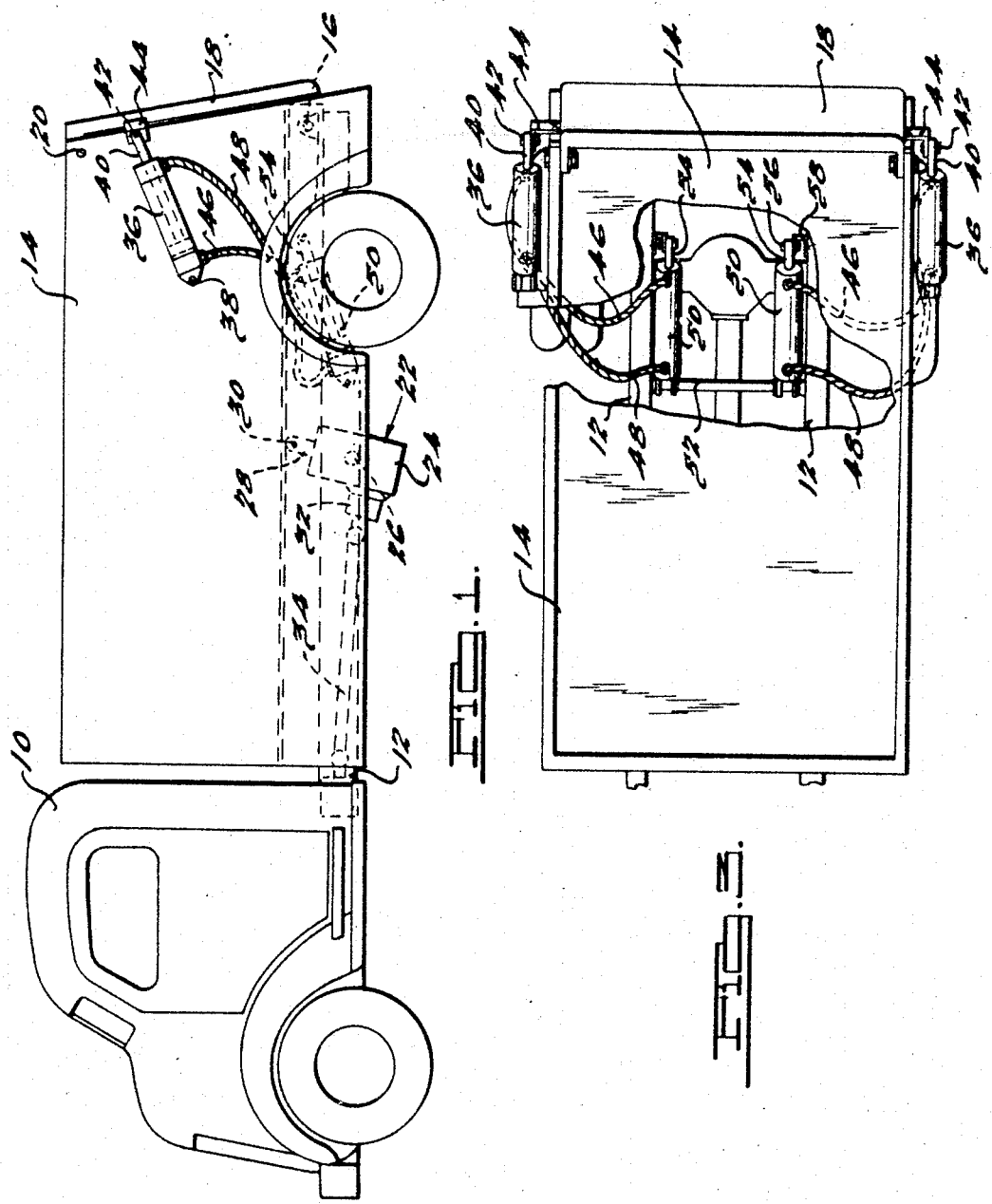
INVENTOR
Edward R. Barrett.
BY
Harness, Dickey & Pierce.
ATTORNEYS.

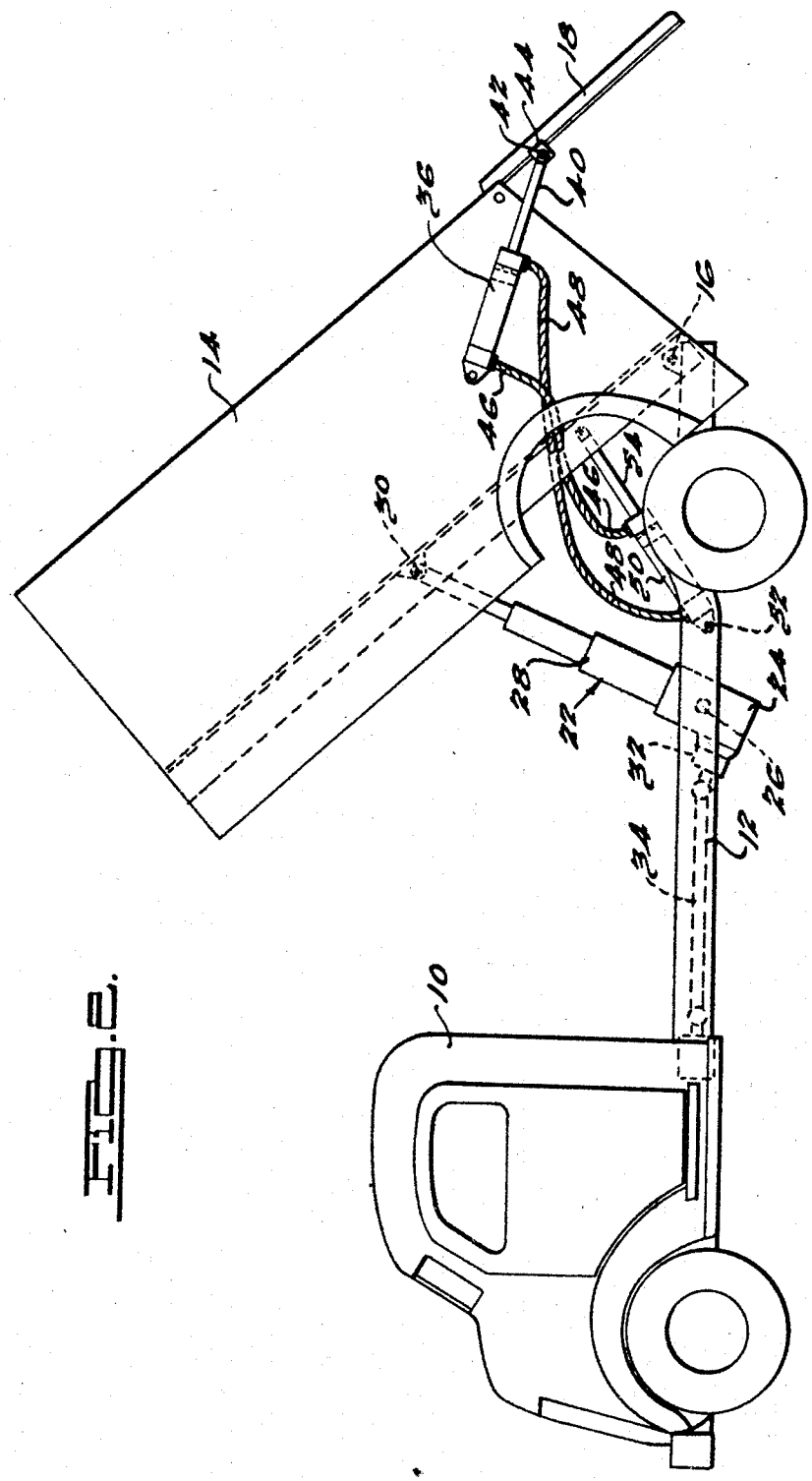

Patented Apr. 22, 1941

2,239,029

UNITED STATES PATENT OFFICE 2,239,029

DUMP BODY

Edward R. Barrett, Detroit, Mich., assignor to Gar Wood Industries, Inc., Detroit, Mich., a corporation of Michigan Application May 20, 1940, Serial No. 336,132

6 Claims. (Cl. 298—23)

The present invention relates to truck dump bodies, either of the type in which the dump body is mounted directly on the truck chassis or of the type in which the dump body is mounted on a trailer.

One of the primary objects of the present invention is to provide an improved and simplified fluid actuated mechanism for opening the body door as such body is dumped.

A further object of the invention is to provide an improved mechanism of the type mentioned, which is independent of the fluid pressures in the fluid operating mechanism for raising the body but which acts automatically in response to the raising of the body to open the body door and to lowering of the body to close the door.

Another object of the invention is to provide an improved mechanism of the type mentioned in which an hydraulic ram may be placed near the body hinge point and be hydraulically connected to another hydraulic ram associated with the body and door, so that the first mentioned ram serves as a stop to limit tilting movement of the body as well as the actuating means for causing operation of the door ram.

Other objects of the invention will become apparent from the following specification, the drawings relating thereto, and from the claims hereinafter set forth.

In the drawings, in which like numerals are used to designate like parts in the several views throughout:

Figure 1 is a side elevational view of an automotive truck having a dump body embodying features of the present invention mounted thereon, in which the dump body is shown in its lowered position;

Fig. 2 is a view similar to Fig. 1, illustrating the dump body in its raised position; and Fig. 3 is a fragmentary plan view, with parts broken away of the structure shown in Fig. 1.

Referring to the drawings for a better understanding of the invention, an automotive vehicle is illustrated, including a cab 10, having an internal combustion engine mounted therein the usual way. The truck chassis is indicated at 12 and has a tiltable dump body 14 pivotally connected thereto adjacent the rear end of the chassis by means of a pivot connection 16, of the usual or conventional construction. Materials are adapted to be dumped through the rear open end of the body which has a closure gate 18 pivotally connected to the body adjacent the top thereof by means of pivot pins 20. The closure gate 18 closes the rear body opening when the body is in its horizontal position, indicated in Figure 1; and opens to permit dumping when the body is tilted, as indicated in Figure 2.

Suitable hoisting means are provided for tilting the body and such means may be of any of the well known types. One such hoisting means is generally indicated at 22 and includes a cylinder 24 pivotally connected to the chassis 12 as indicated at 26. A hydraulic ram 28, in the form of a series of telescopically related cylindrical elements, is operatively associated with the cylinder 24 in the usual way, and the uppermost element of the ram is pivotally connected to the body 14, as indicated at 30. The usual pump and fluid reservoir are indicated at 32 and have the usual inlet and return conduits operatively connected with cylinder 24 in the usual way. A flexible drive 34 is connected to the pump 32 and is operatively connected through a power take-off with the internal combustion engine in the usual way for driving the pump. Suitable and conventional control means are provided in the cab for operating the pump to hoist or lower the body.

According to the present invention, a hydraulic ram is operatively connected to the body 14 and to the gate 18 at each side of the body for moving the gate from its closed position to open position. Such ram includes hydraulic cylinder 36 having its forward end pivotally connected to the body at 38. A piston rod 40 is slidably disposed through the cap end of the cylinder 36 in the usual way with the piston reciprocating within the cylinder in the usual way. The rear end of the rod 40 is pivotally connected by means of a pivot pin 42 to a bracket 44, which is fixed to the gate 18. Lead lines 46 and 48 communicate with the interior of cylinder 36 at opposite ends thereof so that fluid may be introduced through conduit 46 to extend piston rod 40 to open the gate, and fluid within conduit 46 may then flow through conduit 48. When the gate is lowered, fluid may enter cylinder 36 through conduit 48 and may be returned through conduit 46.

So that the closure gate 18 will open automatically when the body is raised and will close automatically when the body is lowered, an hydraulic ram is provided for each of the cylinders 36 and is pivotally connected to the chassis and body. Each of such hydraulic rams includes a cylinder 50 pivotally connected to a pivot shaft 52, which is fixed to the chassis 12. A piston rod 54 is slidably disposed through the cap end of cylinder 50 and is pivotally connected by pivot pin 56 to bracket 58, which is fixed to the body 14. The conduit 46 communicates with its corresponding cylinder 50 through the cap end thereof, and conduit 48 communicates with its corresponding cylinder 50 through the other or lower end thereof. Fluid, such as oil, is provided in cylinders 36 and 50 and in conduits 46 and 48. It will thus be seen that as the body is raised from the position shown in Figure 1 to the position shown in Figure 2, the piston rods 54 are extended so that the pistons within their respective cylinders force oil out through conduits 46 and into cylinders 36 behind the pistons contained therein. This will force the piston rods 40 outwardly and cause the gate 18 to open. During such action, fluid flows from cylinders 36 through conduits 48, back into their corresponding cylinders 50.

The cylinders 50 are positioned between the hoisting means 22 and the pivot or hinge point 16. It will thus be seen that since the cylinders 50 with their piston rods 54 and connections with the body are located close to the hinge point 16, such elements form stops of a rugged character which will limit the tilting movement of the body and prevent taxing thereof.

Also, while in the present embodiment, two cylinders 50 are illustrated with two piston rods connected to the body, it will be evident that a single cylinder could be substituted for the two and be of sufficient capacity to handle the two cylinders 36. With such a construction, the lines leading from the single cylinder could be connected to the cylinders 36 through a T-connection which would act to equalize pressures within the cylinders 36.

Also, according to the broader aspects of the present invention, the conduit 48 could be dispensed with as the weight of the door 18 would be sufficient to return the piston 40 to its lower position and force the oil back into cylinder 50 through conduit 46. It is, however, preferable to provide both conduits 46 and 48 so that the action will be positive in both directions.

It will also be seen that the pressures developed within cylinders 50 and 36 will be entirely independent of the pressures developed in the hoisting mechanism 22. This is desirable, since it will be realized that if a single system were provided in which the circuit for cylinders 50 and 36 communicated with the circuit for the hoisting means 32, the gate would open before the body were tilted. This is true because there would be less resistance to the opening of the gate than to the tilting of the body. It is desirable that the body tilt and the gate open simultaneously, which is accomplished by the structure of the present invention.

Formal changes may be made in the specific embodiment of the invention described without departing from the spirit and substance of the invention, the scope of which is commensurate with the appended claims.

What is claimed is:

1. In an hydraulically operated dump body vehicle, a frame, a body pivotally mounted on said frame, hoist means connected to said body and said frame for tilting said body about its pivots, a closure gate pivoted on said body, an hydraulic ram interconnecting said gate and body for moving said gate on its pivotal support, another hydraulic ram interconnecting said frame and said body, and a conduit connecting said hydraulic rams, whereby fluid displaced from said another ram upon tilting of said body will actuate said first named ram to open said gate.

2. In an hydraulically operated dump body vehicle, a frame, a body pivotally mounted on said frame, a first hydraulic ram connected to said body and said frame for tilting said body, a closure gate pivoted on said body, a second hydraulic ram interconnecting said gate and body for moving said gate on its pivotal support, a third hydraulic ram interconnecting said frame and said body, and a conduit connecting said second and third hydraulic rams, whereby fluid displaced from said third ram upon tilting of said body will actuate said second ram to open said gate.

3. In an hydraulically operated vehicle dump body, a frame, a body pivotally mounted on said frame, a first hydraulic ram connected to said body and said frame for tilting said body, a closure gate pivoted on said body, a second hydraulic ram interconnecting said gate and body for moving said gate on its pivotal support, a third hydraulic ram interconnecting said frame and said body, and a conduit connecting said second and third hydraulic rams, said second and third hydraulic rams and said conduit being independent of the pressures produced in said first hydraulic ram, whereby fluid displaced from said third ram upon tilting of said body will actuate said second ram to open said gate.

4. In an hydraulically operated dump body vehicle, a frame, a body pivotally mounted on said frame, a first hydraulic ram connected to said body and said frame for tilting said body, a closure gate pivoted on said body, a second hydraulic ram interconnecting said gate and body for moving said gate on its pivotal support, a third hydraulic ram interconnecting said frame and said body, and a conduit connecting the cap end of said third ram with the opposite end of said second ram whereby fluid displaced from said third ram upon tilting of said body will actuate said second ram to open said gate.

5. In an hydraulically operated dump body vehicle, a frame, a body pivotally mounted on said frame, hoist means connected to said body and said frame for tilting said body about its pivots, a closure gate pivoted on said body, an hydraulic ram interconnecting said gate and body for moving said gate on its pivotal support, another hydraulic ram disposed between said hoist means and the point of pivotal connection of said body with said frame and interconnecting said frame and said body, and a conduit connecting both of said rams, whereby fluid displaced from said another ram upon tilting of said body will actuate said first named ram to open said gate and whereby said another ram acts as a stop to limit tilting movement of said body.

6. In an hydraulically operated dump body vehicle, a frame, a body pivotally mounted on said frame, a first hydraulic ram connected to said body and said frame for tilting said body a closure gate pivoted on said body, a second hydraulic ram interconnecting said gate and body for moving said gate on its pivotal support, a third hydraulic ram disposed between said first hydraulic ram and the point of pivotal connection of said body with said frame and interconnecting said frame and said body, and conduits connecting said second and third hydraulic rams, whereby fluid displaced from said third ram upon tilting of said body will actuate said second ram to open said gate and whereby said third ram serves as a stop to limit tilting movement of said body.

EDWARD R. BARRETT.